(12) United States Patent
Boulanger et al.

(10) Patent No.: US 10,993,030 B2
(45) Date of Patent: Apr. 27, 2021

(54) SHAPE-SHIFTING HEADPHONES

(71) Applicant: Harman International Industries, Incorporated, Stamford, CT (US)

(72) Inventors: Adam Boulanger, Palo Alto, CA (US); Joseph Verbeke, San Francisco, CA (US); Stefan Marti, Oakland, CA (US); Davide Di Censo, Sunnyvale, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/044,443

(22) Filed: Jul. 24, 2018

(65) Prior Publication Data

US 2020/0037076 A1    Jan. 30, 2020

(51) Int. Cl.
*H04R 5/033* (2006.01)
*H04R 1/10* (2006.01)
*H04R 5/02* (2006.01)
*G06F 3/01* (2006.01)

(52) U.S. Cl.
CPC .......... *H04R 5/0335* (2013.01); *H04R 1/105* (2013.01); *H04R 1/1008* (2013.01); *H04R 1/1058* (2013.01); *H04R 5/02* (2013.01); *G06F 3/016* (2013.01)

(58) Field of Classification Search
CPC ........ H04R 5/02; H04R 5/033; H04R 5/0335; H04R 1/1008; H04R 1/105; H04R 1/1058; H04R 1/1066; G06F 3/016; H04M 1/05
USPC ................................. 381/374, 379, 370, 371
See application file for complete search history.

(56) References Cited

U.S. PATENT DOCUMENTS

| 9,712,909 | B2 | 7/2017 | Cochran et al. |
| 2011/0103631 | A1* | 5/2011 | Fyke .................... H04R 1/1008 381/337 |
| 2012/0155689 | A1 | 6/2012 | Milodzikowski et al. |
| 2013/0121494 | A1 | 5/2013 | Johnston |

(Continued)

FOREIGN PATENT DOCUMENTS

| CN | 106792322 A | 5/2017 | |
| WO | 2017/023243 A1 | 2/2017 | |
| WO | WO-2017023243 A1 * | 2/2017 | .......... H04R 5/0335 |

OTHER PUBLICATIONS

European search report for application No. 19188074.9 dated Nov. 15, 2019.

(Continued)

*Primary Examiner* — Ahmad F. Matar
*Assistant Examiner* — Sabrina Diaz
(74) *Attorney, Agent, or Firm* — Artegis Law Group, LLP

(57) ABSTRACT

A head-worn audio system includes a support frame, a first contact element configured to contact a first portion of a head of a user, a first actuator coupled to the support frame and configured to move the first contact element, a first sensor configured to generate a first sensor signal indicating a first state of the first contact element and a second sensor signal indicating a second state of the first contact element, and a processor. The processor is communicatively coupled to the first actuator and the first sensor and is configured to cause the first actuator to move the first contact element from a first position that corresponds to the first state to a second position that corresponds to the second state, wherein, in the second state, the first contact element is in contact with the head of the user.

18 Claims, 13 Drawing Sheets

(56) References Cited

U.S. PATENT DOCUMENTS

| | | | |
|---|---|---|---|
| 2013/0129106 A1* | 5/2013 | Sapiejewski | H04R 1/105 |
| | | | 381/71.6 |
| 2013/0335536 A1* | 12/2013 | Kura | G02B 27/0176 |
| | | | 348/53 |
| 2014/0146976 A1 | 5/2014 | Rundle | |
| 2014/0146982 A1 | 5/2014 | Pelosi | |
| 2014/0211976 A1 | 7/2014 | Brunner et al. | |
| 2014/0316456 A1 | 10/2014 | Ando | |
| 2016/0033280 A1 | 2/2016 | Moore et al. | |
| 2016/0093207 A1 | 3/2016 | Di Censo et al. | |
| 2016/0198269 A1 | 7/2016 | Ando | |
| 2017/0019729 A1 | 1/2017 | Cochran et al. | |
| 2017/0153268 A1 | 6/2017 | Nahman et al. | |
| 2017/0277254 A1* | 9/2017 | Osman | G06F 3/167 |
| 2017/0332186 A1* | 11/2017 | Riggs | G06F 3/012 |
| 2018/0206021 A1 | 7/2018 | Sindia et al. | |
| 2018/0220218 A1 | 8/2018 | Karacal | |
| 2018/0220219 A1 | 8/2018 | Karacal | |
| 2019/0072772 A1* | 3/2019 | Poore | G02B 27/0176 |

OTHER PUBLICATIONS

European search report for application No. 19188075.6 dated Nov. 15, 2019.

Non-Final Office Action received in U.S. Appl. No. 16/044,445, dated Dec. 13, 2018, 32 pages.

Final Office Action received in U.S. Appl. No. 16/044,445, dated Jun. 10, 2019, 32 pages.

Notice of Allowance received in U.S. Appl. No. 16/044,445, dated Oct. 30, 2019, 19 pages.

* cited by examiner

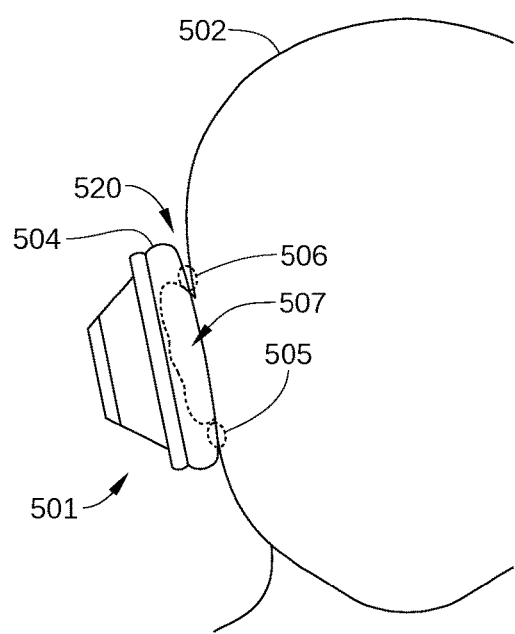 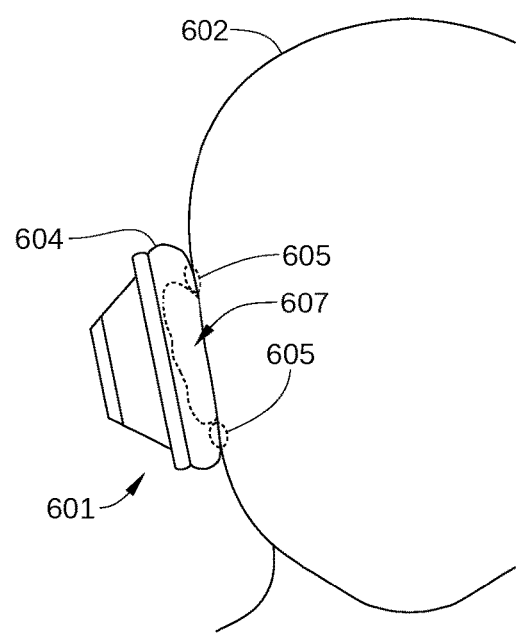
PRIOR ART
FIG. 5
FIG. 6

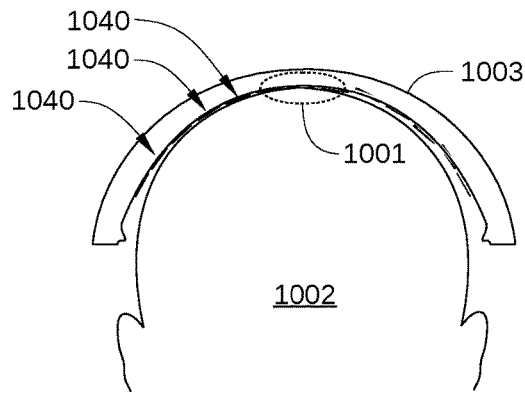
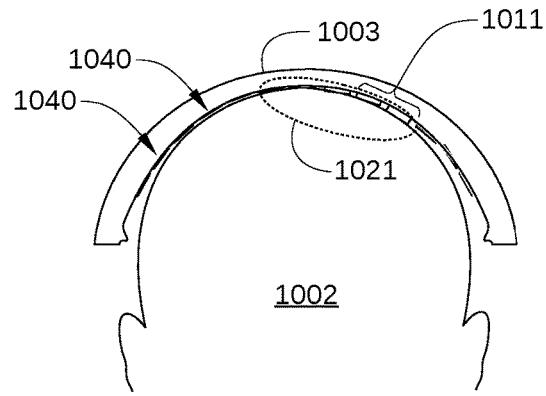
FIG. 10A
FIG. 10B
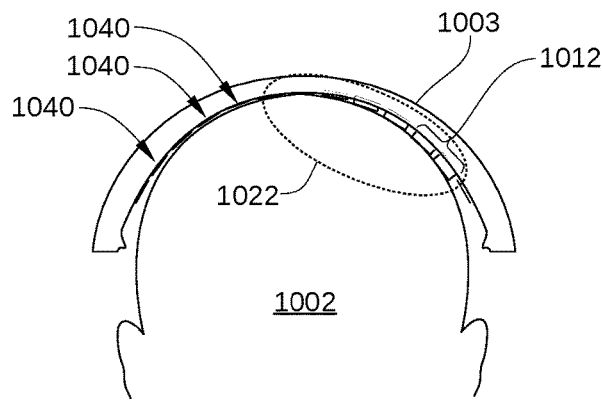
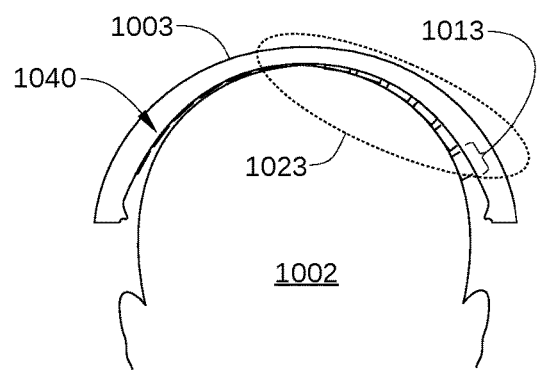
FIG. 10C
FIG. 10D

SHAPE-SHIFTING HEADPHONES

BACKGROUND

Field of the Embodiments

Embodiments of the present disclosure relate generally to computer information systems, and, more specifically, to shape-shifting headphones.

Description of the Related Art

Significant advances have been made in the quality of sound reproduced by headphones, earpieces, and earbuds. For example, when recordings intended to be reproduced via external loudspeakers are played over a set of headphones, the reproduced sound may be perceived as having a point of origin that is between the listener's ears, resulting in an unnatural effect for the listener. To address this issue, stereo and surround sound enhancement systems have been developed to prevent or minimize this effect when audio is reproduced via headphones. In addition, correction filters and other equalization techniques have been employed to further improve the fidelity of sounds reproduced by headphones, including user-specific correction filters that optimize headphone output for a particular user.

Despite such advances, the fidelity of sound reproduced by headphones, earbuds, and other head-worn audio devices is limited, because the acoustics of such audio devices are designed with a reference seal that is rarely fully achieved by end users due to variations in hair, head shape, outer ear shape, and ear canal shape, which generally vary from the reference employed by the manufacturer. When the earcups do not seal completely, or when earbuds do not fit well, these audio devices do not perform according to the intended target frequency curve. This issue is particularly noticeable in the low-frequency regime.

Further, the fidelity of sound reproduced by headphones, earbuds, and other head-worn audio devices can also be limited by the impact of external sounds mixing with the sound reproduced by the head-worn audio device. Because the biggest source of such external sounds is typically leakage around the sealing surfaces of the head-worn audio device, significant attention has been directed to the development of resilient headphone cushions and earbud sealing surfaces that isolate external sounds from the ears of the user. However, because the size and shape of the head and ear canal of each user is unique, implementing a single headphone cushion configuration or earbud seal will be less than perfect for many users. As a result, many users are likely to hear significant external sounds mixed with reproduced sound when using a one-size-fits-all head-worn audio device.

Further, besides providing hi-fidelity sound reproduction, head-worn audio devices also enable a user to multi-task more effectively, when the head-worn audio device also functions as a hands-free audio device. For instance, when wearing wireless headphones, a user can participate in a telephone conversation or listen to music while simultaneously performing other activities, such as driving, doing household chores, and the like. However, use of a head-worn audio device in this way can adversely impact the other activities being performed. Specifically, auditory conveyance of information to the user necessarily interrupts the current use of the head-worn audio device. For example, when participating in a telephone call via an earpiece or earbuds, the user is generally precluded from receiving auditory driving instructions without audibly interrupting the telephone call. Consequently, to avoid missing any of the conversation, the user typically must rely on a visual medium for driving instructions, which may require the user to look away from the road. Thus, the multi-tasking that is enabled by a head-worn audio device is offset, in part, because the user is unable to receive information auditorily.

In light of the above, more effective techniques for providing high-fidelity sound reproduction in a head-worn audio device and enabling a user to receive information while using a head-worn audio device would be useful.

SUMMARY

The various embodiments set forth a system that includes a support frame; a first contact element configured to contact a first portion of a head of a user; a first actuator coupled to the support frame and configured to move the first contact element; a first sensor configured to generate a first sensor signal indicating a first state of the first contact element and a second sensor signal indicating a second state of the first contact element; and a processor. The processor is communicatively coupled to the first actuator and the first sensor and is configured to cause the first actuator to move the first contact element from a first position that corresponds to the first state to a second position that corresponds to the second state, wherein, in the second state, the first contact element is in contact with the head of the user.

At least one advantage of the disclosed embodiments is that a head-worn audio device can be adapted to the ear, scalp, or other surfaces of the head of a particular user in order to minimize or otherwise reduce leakage of the produced sound field, which in turn reduces the acoustic fidelity, as well as minimize or otherwise reduce leakage of ambient sound to the user. A further advantage is that information, such as navigation instructions, can be provided to the wearer of a head-worn audio device in a tactile way, without interrupting an audio and/or visual presentation to the user.

BRIEF DESCRIPTION OF THE SEVERAL VIEWS OF THE DRAWINGS

So that the manner in which the above recited features of the various embodiments can be understood in detail, a more particular description of the various embodiments, briefly summarized above, may be had by reference to embodiments, some of which are illustrated in the appended drawings. It is to be noted, however, that the appended drawings illustrate only typical embodiments and are therefore not to be considered limiting of its scope, for the various embodiments may admit to other equally effective embodiments.

FIG. 5 schematically illustrates an earcup of a conventional headphone system positioned on a head of a wearer.

FIG. 6 schematically illustrates an earcup of a headphone system positioned on a head of a wearer, according to various embodiments of the present disclosure.

FIGS. 10A-10D schematically illustrate a headband of a headphone system at various times during the process of conveying navigation information to a wearer, according to an embodiment of the present disclosure.

For clarity, identical reference numbers have been used, where applicable, to designate identical elements that are common between figures. It is contemplated that features of one embodiment may be incorporated in other embodiments without further recitation.

DETAILED DESCRIPTION

So that the manner in which the above recited features of the various embodiments can be understood in detail, a more particular description of the various embodiments, briefly summarized above, may be had by reference to embodiments, some of which are illustrated in the appended drawings. It is to be noted, however, that the appended drawings illustrate only typical embodiments and are therefore not to be considered limiting of its scope, for the various embodiments may admit to other equally effective embodiments.

Figure 1:
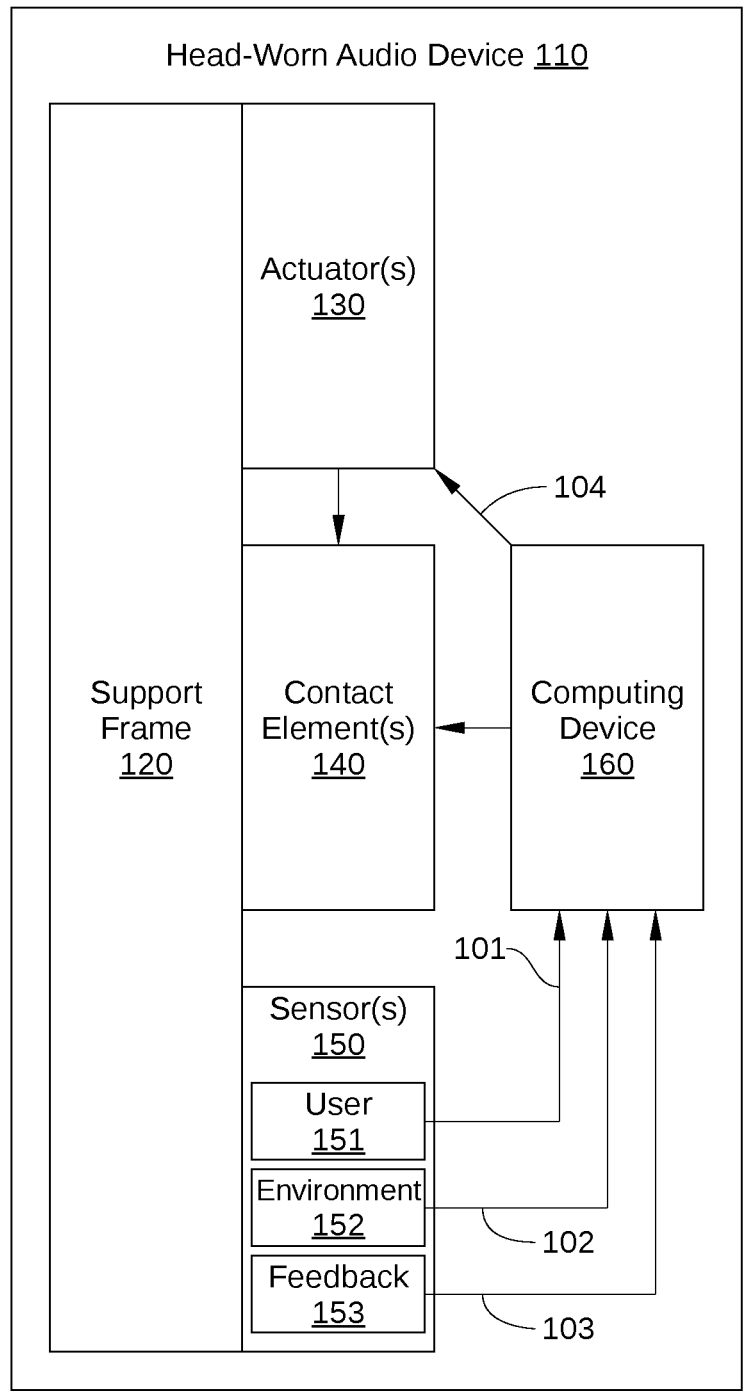
FIG. 1 is a schematic diagram illustrating a head-worn audio system, configured to implement one or more aspects of the various embodiments of the present disclosure.

FIG. 1 is a schematic diagram illustrating a head-worn audio system 100, configured to implement one or more aspects of the various embodiments of the present disclosure. Head-worn audio system 100 is configured to produce a superior and user-specific acoustic seal when worn, and/or to provide a communication channel for information to a wearer, such as navigation information. Specifically, elements of head-worn audio system 100 can change shape to form the acoustic seal and to communicate information, alerts, and notifications to the wearer of head-worn audio system 100, hereinafter referred to as the "wearer." Such shape changes direct physical forces to various parts of the wearer's ear, the entire ear, or the regions of the head proximal to the ear such that the ear feels surrounded and the forces feel directed relative to the ear. In embodiments in which head-worn audio system 100 is implemented as a headphone-based assembly, each earcup of the headphone based assembly can change shape and size independently from each other, providing a superior acoustic seal and/or communicating information to the wearer. These changes can occur inside the earcup, between the headphone casing and the wearer's ear, and/or along a headband of a headphone assembly. Because neither hearing nor vision is used to receive information provided in this way, receipt by the user of such information is unlikely to compete or interfere with audio or visual presentations to the wearer.

Head-worn audio system 100 includes at least one head-worn audio device 110. In embodiments in which head-worn audio system 100 is implemented as a headphone based assembly, head-worn audio device 110 can be an earcup of the headphone-based assembly. In embodiments in which head-worn audio system 100 is implemented as an ear-worn audio device, such as a pair of stereo earbuds or an earpiece, head-worn audio device 110 can be a single earbud or earpiece. Head-worn audio device 110 includes a support frame 120 on which or within which are mounted one or more actuators 130, contact elements 140, sensors 150, and a computing device 160.

Head-worn audio device 110 can be any technically feasible head-worn or head-mountable device that includes an audio playback subsystem for reproducing recorded audio, such as a loud speaker or other sound-generating device. In some embodiments, head-worn audio device 110 also includes a microphone or other sound-receiving device. For example, in some embodiments, head-worn audio system 100 can be configured as a headphone-based assembly, such as supra-aural headphones, which rest directly on the wearer's outer ear, or circumaural headphones, which completely surround the ears. In other embodiments, head-worn audio system 100 can be configured as an earpiece/microphone assembly or as a single or a pair of earbuds.

Support frame 120 includes a rigid structure on which actuators 130 are mounted or within which actuators 130 are housed. Support frame 120 acts as a platform from which actuators 130 can cause movement of or change the shape of contact elements 140. Support frame 120 can include, without limitation, one or more components of head-worn audio system 100 that are in-ear, over-ear, surround the wearer's ear, rest on the wearer's ear, and/or contact the top and/or sides of the wearer's head. In embodiments in which head-worn audio system 100 is implemented as a headphone based assembly, support frame 120 can be a housing of an earcup and/or a headband in the headphone-based assembly. In embodiments in which head-worn audio system 100 is implemented as an ear-worn audio device, such as a pair of stereo earbuds or an earpiece, support frame 120 can be a rigid structure within the earbud or earpiece and/or a portion of an external housing of the earbud or earpiece.

Actuators 130 are disposed between support frame 120 and a surface of the head of a wearer of head-worn audio system 100, and are configured to drive motion and/or shape-changing of contact elements 140. For example, in embodiments in which head-worn audio system 100 is implemented as a headphone-based assembly, actuators 130 can be disposed on each earcup of headphone-based assembly. Alternatively or additionally, actuators 130 can be disposed along the frame of the headphone-based assembly, allowing some or all of actuators 130 to apply physical pressure on the head of the wearer on, in, or around the ear and/or a surface of the head that comes in contact with the frame of the headphone-based assembly.

In some embodiments, each of actuators 130 is configured to cause the movement of one of contact elements 140, deform the surface of a material included in one of contact elements 140, and/or change the structure of the material included in one of contact elements 140 so that the contact element 140 is repositioned, deformed, or altered in shape. Thus, in some embodiment, actuators 130 cause contact elements 140 to achieve a specific intended shape. As a result, pressure distribution to the location on the wearer's head that corresponds to that contact element 140 is noticeably varied by the wearer. Locations on the wearer's head that correspond to one of contact elements 140 can be, for example, on, in, or around the ear and/or across the top of the head. Such changes in pressure to such locations on the wearer's head can generate a robust acoustic seal around the ear of the wearer and/or be employed to provide information non-visually and non-verbally to the wearer.

Actuators 130 may include, without limitation, a mechanical or electromagnetic actuator that exerts a force against one or more of contact elements 140 (e.g., an electric motor, a solenoid, a mechanical actuator, a piezoelectric actuator, a magnetic actuator, and the like); a pneumatic actuator and associated bladder that causes motion of one or more contact elements 140; a hydraulic actuator or other fluid actuation device that causes motion of one or more contact elements 140; and/or a compressed gas actuator that causes motion of or exerts a force against one or more contact elements 140. Alternatively or additionally, in some embodiments, actuators 130 may include, without limitation, an apparatus that causes a "smart material" included in contact elements 140 to change to a specific target shape. Examples of such "smart materials" include, without limitation, one or more shape memory alloys (SMAs), (such as Nitinol, which is actuated using heat from electrical current), materials that are actuated using electric or magnetic fields (such as ferrofluids), and materials that are actuated using light (such as photomechanical materials). In such embodiments, actuators 130 may include, without limitation, a heating device configured to apply heat to a shape-memory alloy included in one or more contact elements 140; a device configured to apply an electric field to a material in one or more contact elements 140 that is actuated via the electric field; a device configured to apply a magnetic field to a material in one or more contact elements 140 that is actuated via the magnetic field; and a device configured to apply light to a photomechanical material in one or more contact elements 140.

In some embodiments, an actuator 130 exerts a force against a corresponding contact element 140 by displacing the contact element 140 or moving the contact element to a different position, and in other embodiments, an actuator 130 exerts a force against a corresponding contact element 140 by causing the corresponding contact element 140 to change shape, for example via pneumatic pressure, application of an electric or magnetic field, light, etc.

In some embodiments, a single actuator 130 corresponds to a single contact element 140. In other embodiments, a single actuator 130 is configured to cause movement in and/or change the shape of multiple contact elements 140 included in head-worn audio device 110, or in all of the contact elements 140 included in head-worn audio device 110. For example, in one such embodiment, actuator 130 includes an air-filled bladder that, when inflated, repositions multiple contact elements 140, such as the contact elements on an upper half of an earcup.

Contact elements 140 are disposed on or make up a surface of head-worn audio device 110 that contacts a surface of the ear and/or head of a wearer of head-worn audio system 100. In embodiments in which head-worn audio system 100 is implemented as a headphone-based assembly, contact elements 140 can be incorporated into a cushion of an earcup and/or along a surface of a headband in the headphone-based assembly. In embodiments in which head-worn audio system 100 is implemented as an ear-worn audio device, contact elements 140 can be formed on an outer surface of the earbud or earpiece. Contact elements may include, without limitation, a smart material whose shape is controllable, a covering material that changes shape, an elastic material that encloses air or other fluid, and the like.

Sensors 150 are configured to monitor and provide feedback associated with the shape-changing progress of actuators 130 and contact elements 140, to sense the environment around the wearer and/or receive signals from the environment around the wearer, and/or to sense contact surfaces of the head or ears of the wearer. Sensors 150 can include, without limitation, one or more of user sensors 151, environment sensors 152, and/or feedback sensors 153.

User sensors 151 are configured to determine head and ear shape of the wearer and/or to detect failure of one or more contact elements 140 to contact a surface of the head or ears of the wearer and form an acoustic seal. User sensors 151 can be part of or mounted to support frame 120, embedded within a corresponding contact element 140, coupled to a corresponding actuator 130, or positioned in any other suitable location on or within head-worn audio device 110.

Sensor output 101 from user sensors 151 can be employed by computing device 160 (described below) to 1) determine how to cause actuators 130 to move or change the shape of contact elements 140 so that head-worn audio device 110 is better sealed against ambient sound and/or to 2) communicate information to the wearer. For example, in determining how to improve an acoustic seal of head-worn audio device 110, a contact pressure between each contact element 140 and a corresponding surface on the head or ear of the user can be measured by a piezoelectric or other pressure sensor included in user sensors 151 and disposed on the surface of the contact element 140. Similarly, light leakage into a sound cavity proximate an ear of the wearer can be measured by an optical sensor included in user sensors 151, and sufficient contact between a contact element 140 and a corresponding surface on the head or ear of the user can be measured by a thermal sensor or other contact sensor included in user sensors 151 and disposed on the surface of the contact element 140.

Environment sensors 152 are configured to determine when and how actuators 130 are to be employed to cause motion and/or changes in shape of contact elements 140 so that specific information is communicated to the wearer. Thus, in some embodiments, environment sensors 152 generate environmental inputs 102 that are recognized as triggers and/or information to be conveyed to the wearer by computing device 160. For example, in some embodiments, environment sensors 152 include, without limitation, location sensors compatible with receiving signals from transmitters associated with a Global Navigation Satellite System (GNSS) (e.g., global positioning system (GPS), GLONASS, and Galileo), imaging sensors (such as digital cameras, depth cameras, and infrared cameras), rangefinders (such as ultrasonic rangefinders, infrared rangefinders, laser- and radar-based sensors), and the like. Alternatively or additionally, environment sensors 152 can include a sensor or wireless communication device operable to receive or request information from a database of map information.

In operation, environment sensors 152 are configured to receive and/or generate information that enables computing device 160 to determine that there is certain information to be conveyed to a wearer, such as navigation information, alerts to an event having occurred, an indication of a direction in which to move or look, and the like.

Feedback sensors 153 are configured to monitor and provide feedback associated with the shape-changing progress and/or motion of actuators 130 and contact elements 140. For instance, when feedback sensors 153 include a strain gauge coupled to each of contact elements 140, a feedback signal 103 is transmitted to computing device 160 indicating what displacement of or shape change by a particular contact element 140 has occurred. Similarly, when feedback sensors 153 include a pneumatic pressure sensor, feedback signal 103 indicates how much of an inflation process is complete. Other types of feedback sensor can also be included in feedback sensors 153. Such sensors may include, without limitation, a resistive sensor such as a potentiometer that indicates a mechanical displacement of an actuator 130 or a contact element 140, a fluid pressure sensor associated with an actuator 130, a fluid flow sensor associated with an actuator 130, a piezoelectric sensor disposed on one of contact elements 140, and an acoustic sensor positioned to measure a sound volume of sound generated by head-worn audio device 110 that is leaking out of head-worn audio device 110. For example, in determining how to improve an acoustic seal of head-worn audio device 110, audio leaking from head-worn audio device 110 can be measured by an acoustic sensor included in feedback sensors 153, such as a microphone included in head-worn audio device 110. In some embodiments, feedback sensors 153 include at least one of an optical sensor exposed to a cavity between an ear of the wearer and head-worn audio device 110, an optical sensor configured to measure a light source included in head-worn audio device 110, an acoustic sensor included in head-worn audio device 110, a thermal sensor in thermal contact with a contact element 140, a strain gauge disposed on a contact element 140, a fluid pressure sensor associated with an actuator 130, a fluid flow sensor associated with an actuator 130, and a piezoelectric sensor disposed on a contact element 140.

In operation, feedback sensors 153 generate a feedback signal 103 for one or more actuators 130, where feedback signal 103 indicates a current state of the one or more actuators 130. In some embodiments, the current state of the one or more actuators 130 includes, without limitation, at least one of a current actuation position of the one or more actuators, a current pneumatic pressure applied to the one or more actuators, a current hydraulic pressure applied to the one or more actuators, a current contact pressure between a contact element 140 and a corresponding portion of the head of the wearer, a current temperature of a shape-memory alloy included in a contact element 140, a current electric field strength applied to a material that is actuated via the electric field and included in a contact element 140, a current magnetic field strength applied to a material that is actuated via the magnetic field and included in a contact element 140, a current intensity of light applied to a photomechanical material included in a contact element 140, and a current intensity of light entering a cavity between an ear of the wearer and head-worn audio device 110.

Computing device 160 is configured to implement one or more aspects of the present disclosure described herein. More specifically, computing device 160 causes actuators 130 to move or change the shape of contact elements 140, and makes determinations as to when and how actuators 130 implement such movement and shape-changing of contact elements 140. Thus, in some embodiments, computing device 160 makes such determinations based on the current application or mode of head-worn audio device 110 and/or on feedback signal(s) 103 received from feedback sensors 153. In some embodiments, computing device 160 transmits signals 104 to actuators 130 to cause actuators 130 to move or change the shape of contact elements 140.

Computing device 160 may be any type of device capable of executing application programs including, without limitation, instructions associated with head-worn audio device 110. For example, and without limitation, computing device 160 may be implemented as a stand-alone chip, such as a microprocessor, or as part of a more comprehensive solution that is implemented as an application-specific integrated circuit (ASIC), a system-on-a-chip (SoC), and so forth. Generally, computing device 160 may be configured to coordinate the overall operation of a computer-based system, such as head-worn audio system 100.

In some embodiments, computing device 160 can be incorporated into head-worn audio device 110. Alternatively, the functionality of computing device 160 can be incorporated into a mobile computing device, such as a suitably programmed smartphone, electronic tablet, smart watch, or other wearable that communicates with head-worn audio device 110. One embodiment of computing device 160 is described below in conjunction with FIG. 2.

Figure 2:
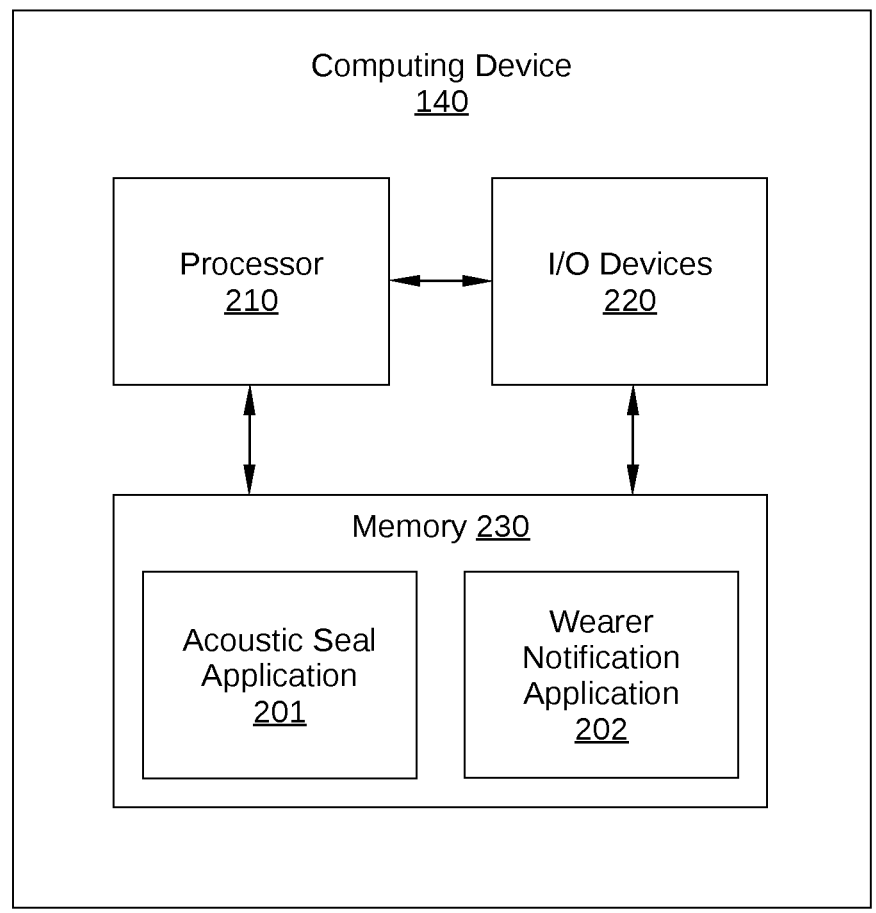
FIG. 2 is a more detailed illustration of a computing device of the head-worn audio system of FIG. 1, according to various embodiments of the present disclosure.

FIG. 2 is a more detailed illustration of computing device 160, according to various embodiments of the present disclosure. Computing device 160 may be any type of device capable of executing application programs including, without limitation, instructions associated with an acoustic seal application 201 and/or wearer notification application 202. Generally, computing device 160 may be configured to coordinate the overall operation of a computer-based system, such as head-worn audio system 100. In some embodiments, computing device 160 may be coupled to, but separate from, such a computer-based system. In such embodiments, the computer-based system may include a separate processor that transmits data to computing device 160, such as sensor output 101, environmental inputs 102, and/or feedback signal 103, and may be included in a consumer electronic device, such as a personal computer, smartphone, or headphone-based device. As shown, computing device 160 includes, without limitation, a processor 210, input/output (I/O) devices 220, and a memory 230.

Processor 210 may be implemented as a central processing unit (CPU), a graphics processing unit (GPU), an ASIC, a field programmable gate array (FPGA), any other type of processing unit, or a combination of different processing units. In general, processor 210 may be any technically feasible hardware unit capable of processing data and/or executing software applications to facilitate operation of head-worn audio system 100 of FIG. 1, as described herein. Among other things, and without limitation, processor 210 may be configured to execute instructions associated with acoustic seal application 201 and/or wearer notification application 202.

Memory 230 may include a random access memory (RAM) module, a flash memory unit, or any other type of memory unit or combination thereof, and may include a single memory module or a collection of memory modules. As shown, in some embodiments, acoustic seal application 201 and/or wearer notification application 202 may reside in memory 230 during operation. Acoustic seal application 201 receives feedback signal 103 from feedback sensors 153, determines whether changes can be made via actuator(s) 130 to improve an acoustic seal for head-worn audio device 110, and causes actuator(s) 130 to move and/or change the shape of contact elements 140 to improve the acoustic seal. Wearer notification application 202 determines that there is information to be conveyed to the wearer, determines in what way actuator(s) 130 can be employed to convey the information to the user, and causes actuator(s) 130 to move and/or change the shape of contact elements 140 to convey the information to the user.

I/O devices 220 includes one or more devices capable of receiving input, such as a keyboard, a mouse, a touch-sensitive screen, a microphone (including an acoustic sensor included in head-worn audio device 110) and so forth, as well as devices capable of providing output, such as a display screen, loudspeakers (including a loudspeaker included in head-worn audio device 110), and the like. The display screen may be incorporated in head-worn audio system 100 or may be external to head-worn audio system 100, such as a computer monitor, a video display screen, a display apparatus incorporated into a separate hand held device, or any other technically feasible display screen.

Returning to FIG. 1, in some embodiments, computing device 160 can be configured to operate in one or more different modes of controlling actuators 130. In some embodiments, computing device 160 is configured to operate in a binary actuation mode, and in other embodiments, computing device 160 is configured to operate in a variable actuation mode.

When operating in a binary actuation mode, computing device 160 is configured to cause each actuator 130 to exert a target force of a specific fixed magnitude against a respective contact element 140 in a binary (or "on/off") actuation mode. That is, a particular actuator 130 either exerts the target force of the specific fixed magnitude against the respective contact element 140 or exerts no force against that contact element. Thus, in binary actuation mode, actuators 130 are generally operated to move between two positions, which effects a change in a contact element from a default or un-changed shape (or unchanged position) to a fully deformed shape (or fully changed positioned). For example, in one embodiment, in binary actuation mode computing device 160 either continuously provides electrical current at a certain rate to an actuator 130 or provides no current to the actuator 130.

When operating in a variable actuation mode, computing device 160 is configured to cause each actuator 130 to exert a target force of any suitable magnitude against a respective contact element 140. Thus, in the variable actuation mode, computing device 160 determines a suitable magnitude for the target force and then causes the actuator 130 to exert the target force at the suitable magnitude against the contact element 140. In some embodiments, computing device 160 determines the suitable magnitude for the target force based on one or more of a targeted displacement or movement of a contact element 140, a targeted volume of a contact element 140, and/or a targeted surface area of a contact element 140. Alternatively or additionally, computing device 160 determines the suitable magnitude for the target force based on a speed of movement or change in shape of a contact element 140 and/or a frequency of actuation of the contact element 140. Alternatively or additionally, in some embodiments, computing device 160 determines a suitable excursion amount for actuators 130. That is, instead of setting a force, computing device 160 sets a target position, such as a percentage of actuation or equivalent displacement distance (e.g., in millimeters). In such embodiments, feedback signal 103 from feedback sensors 153 can provide the current excursion amount and/or position of each actuator 130.

In some embodiments, when operating in a variable actuation mode, computing device 160 determines the suitable magnitude for the target force based on sensor output 101 or feedback signal 103. For example, feedback signal 103 from a particular feedback sensor 153 can indicate that a corresponding actuator 130 has not changed a shape of a contact element 140 so that the contact element 140 has changed to a targeted shape, and therefore the actuator 130 should exert a different force on the contact element 140 that is based on information included in the feedback signal 103. Thus, in variable actuation mode, actuators 130 are generally operated to move between various positions and/or exert variable forces against corresponding contact elements 140.

Figure 3:
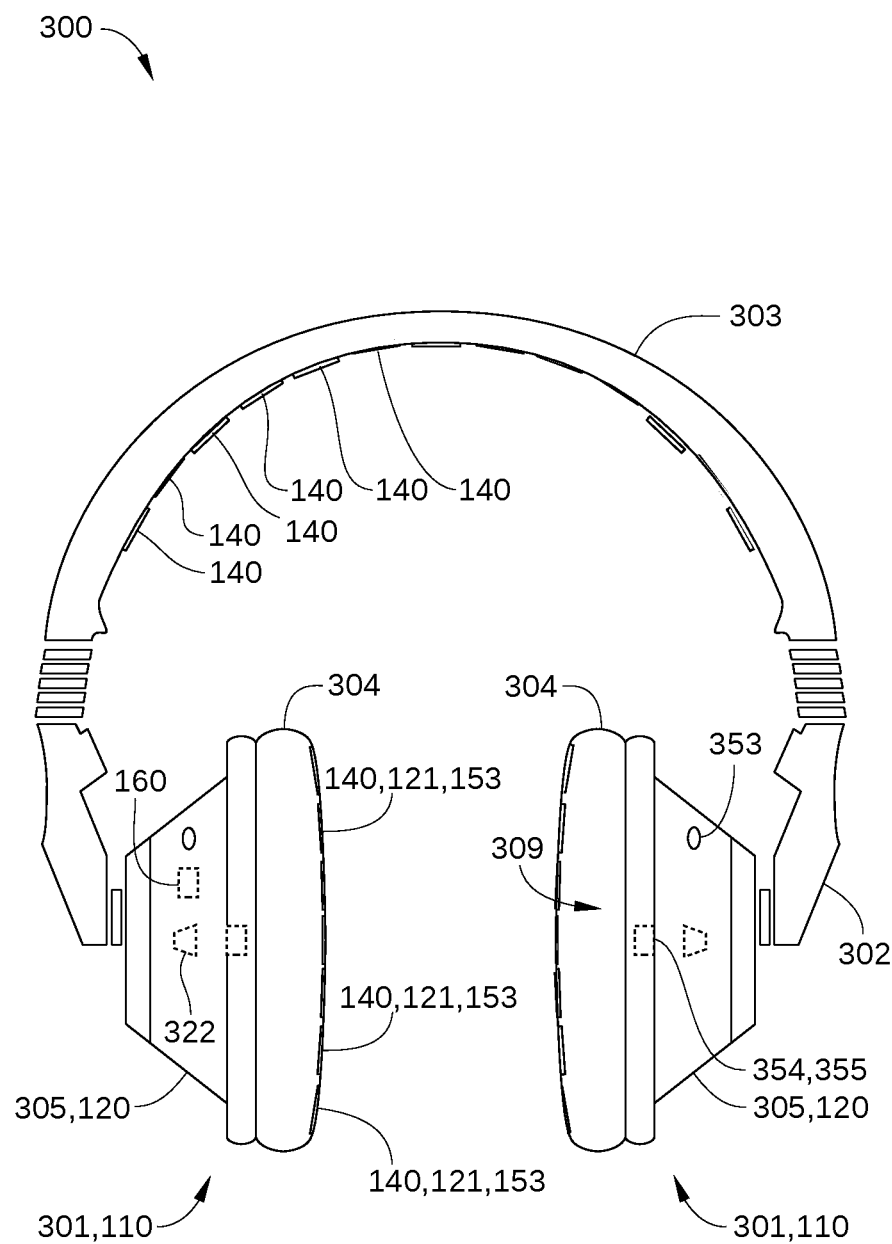
FIG. 3 is a schematic diagram illustrating a headphone system configured to implement one or more aspects of the present disclosure.
Figure 4:
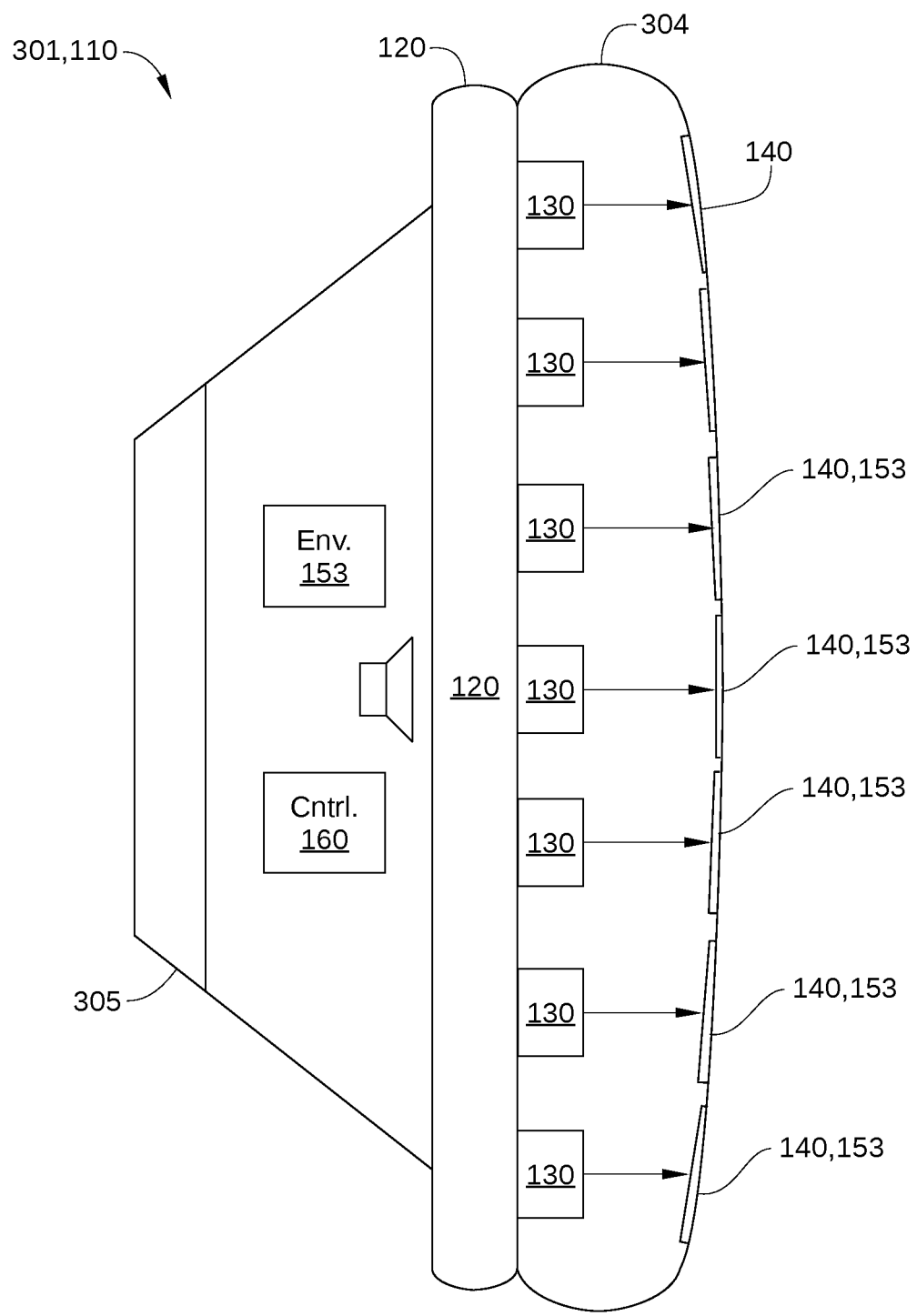
FIG. 4 is a more detailed illustration of an earcup of the headphone system of FIG. 3, according to one or more aspects of the present disclosure.

In some embodiments, head-worn audio system 100 is implemented in a headphone-based assembly. One such embodiment is illustrated in FIGS. 3 and 4. FIG. 3 is a schematic diagram illustrating a headphone system 300 configured to implement one or more aspects of the present disclosure, and FIG. 4 is a more detailed illustration of an earcup 301 of FIG. 3, according to one or more aspects of the present disclosure. Headphone system 300 may include, without limitation, two earcups 301 coupled to a headband 303 via a respective arm 302. Each earcup 301 is configured to fit over the outer ear of a wearer, and includes, among other things, a loudspeaker 322 and an ear-surround cushion 304 coupled to a housing 305. Headband 303 and earcups 301 each act as a respective portion of support frame 120 of headphone system 300. In some embodiments, headphone system 300 may be configured with a single earcup 301. Furthermore, in some embodiments, headphone system 300 may be configured as a supra-aural headphone system, while, in other embodiments, headphone system 300 may be configured as a circumaural headphone system. In the embodiment illustrated in FIG. 3, headphone system 300 is configured as a circumaural headphone system.

As shown, head-worn audio device 110 is incorporated into headphone system 300.

Thus, included in earcups 301 are one or more actuators 130 that are coupled to a portion of housing 305/support frame 120, and corresponding contact elements 140 that are disposed on or included in a surface of ear-surround cushion 304. Alternatively or additionally, in some embodiments, one or more contact elements 140 and corresponding actuators 130 are also included in headband 130 (actuators 130 in headband 303 are omitted in FIG. 3 for clarity). In the embodiment illustrated in FIGS. 3 and 4, computing device 160 and one or more sensors are included in one or both of earcups 301. For example, in some embodiments, a user sensor 121 (e.g., a piezoelectric pressure gauge) and/or a feedback sensor 153 (e.g., a piezoelectric pressure gauge or a strain gauge) can be disposed on or proximate to each of contact elements 140. In such embodiments, the piezoelectric pressure gauge can generate sensor output 101 or feedback signal 103 (shown in FIG. 1) indicating a contact pressure between a corresponding contact element and a portion of a surface of the wearer's head, while the strain gauge can generate feedback signal 103 indicating a displacement of the corresponding actuator 130 or contact element 140. Alternatively or additionally, in some embodiments, an acoustic sensor 353 can be included in one or both of earcups 301 (facing outwards) to generate feedback signal 103 indicating a sound energy level of sound leaking from a particular earcup. Alternatively or additionally, in some embodiments, an acoustic sensor 354 and/or optical sensor 355 can be included in each earcup 301 (facing inwards) and exposed to a cavity 309 disposed between an ear (not shown) of the wearer and the earcup 301. In such embodiments, optical sensor 355 can generate feedback signal 103 indicating a current intensity of light entering cavity 309 and acoustic sensor 354 can generate feedback signal 103 indicating a current sound energy level of ambient sound leaking into cavity 309. Earcups 150 can further include, without limitation, one or more additional sensors 150, described above in conjunction with FIG. 1, to generate one or more of sensor output 101, environmental inputs 102, and/or feedback signals 103.

When headphone system 300 is worn by a user, portions of ear-surround cushion 304 seal against the wearer's head, so that each earcup 301 forms an acoustic cavity around one of the user's ears. Ideally, ear-surround cushion 304 conforms closely to the shape of the wearer's head and forms an acoustic cavity proximate the ear of the wearer that is acoustically isolated from the surroundings for enhanced listening. In practice, because the ear-surround cushions of a conventional headphone system do not perfectly conform to the shape of each wearer's head, ambient sound can mix with sound reproduced by the headphone system, and sound reproduced by the headphone system leaks out and decreases the acoustic fidelity for the wearer, as shown in FIG. 5. FIG. 5 schematically illustrates an earcup 501 of a conventional headphone system positioned on a head 502 of a wearer. As shown, an ear-surround cushion 504 of earcup 501 seals against some surfaces 505 of head 502. However, because earcup 501 and ear-surround cushion 504 do not completely conform to the shape of head 502, one or more gaps 520 are present between ear-surround cushion 504 and a surface 506 of head 502. As a result, ambient sound can enter an acoustic cavity 507 that is formed when earcup 501 is worn by the wearer, and sound reproduced by the headphone system leaks out and decreases the acoustic fidelity for the wearer. According to embodiments of the present disclosure, a more robust seal can be formed between contact elements of an ear-surround cushion (and/or a headband) of a head-worn audio device and a wearer's head than in a conventional head-worn audio device. One such embodiment is illustrated in FIG. 6.

FIG. 6 schematically illustrates an earcup 601 of a headphone system positioned on a head 602 of a wearer, according to various embodiments of the present disclosure. As shown, earcup 601 includes an ear-surround cushion 604 that seals against surfaces 605 of head 602. Because actuators 130 (not shown) can move and/or change the shape of contact elements (not shown) disposed on ear-surround cushion 604, ear-surround cushion 604 conforms to the shape of head 602, and no or very few gaps are present between ear-surround cushion 604 and surfaces 605. As a result, the ambient sound that can enter an acoustic cavity 607 that is formed when earcup 601 is worn by the wearer is greatly reduced or minimized, and the overall acoustic fidelity of the system is increased because the headphone produced sound is not leaking out. In some embodiments, contact elements disposed on ear-surround cushion 604 are caused to form a non-uniform profile to better conform to the shape of head 602. One such embodiment is illustrated in FIG. 7.

Figure 7:
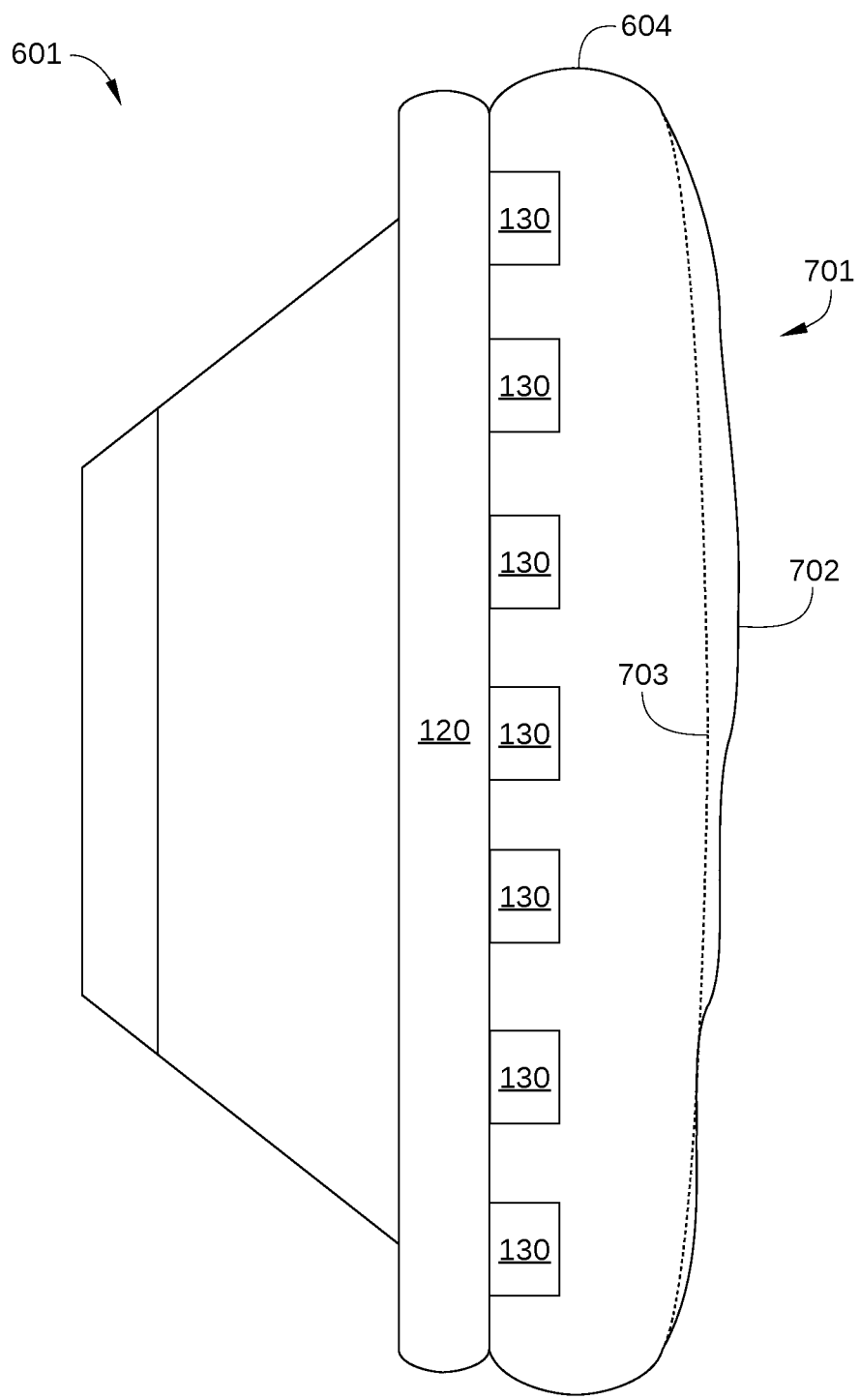
FIG. 7 schematically illustrates an earcup when actuators in the earcup cause contact elements disposed on an ear-surround cushion to form a non-uniform profile, according to various embodiments of the present disclosure.

FIG. 7 schematically illustrates earcup 601 when actuators in earcup 601 cause contact elements disposed on ear-surround cushion 604 to form a non-uniform profile, according to various embodiments of the present disclosure. As shown, a contact surface 701 of ear-surround cushion 604 has a non-uniform profile 702 that varies from a default profile 703. Non-uniform profile 702 is generated when each of a plurality of actuators included in earcup 601 exerts a targeted force against a respective contact element (not shown for clarity) disposed on contact surface 701.

In the embodiment illustrated in FIG. 7, non-uniform profile 702 is employed to improve an acoustic seal and/or to change the overall acoustics of a head-worn audio device, and is implemented by non-uniform changes in the shape of ear-surround cushion 604. In other embodiments, physical pressure is asymmetrically applied to the head of the wearer, either over time or across different portions of an ear-surround cushion, to convey information to a user. One such embodiment is illustrated in FIG. 8.

Figure 8:
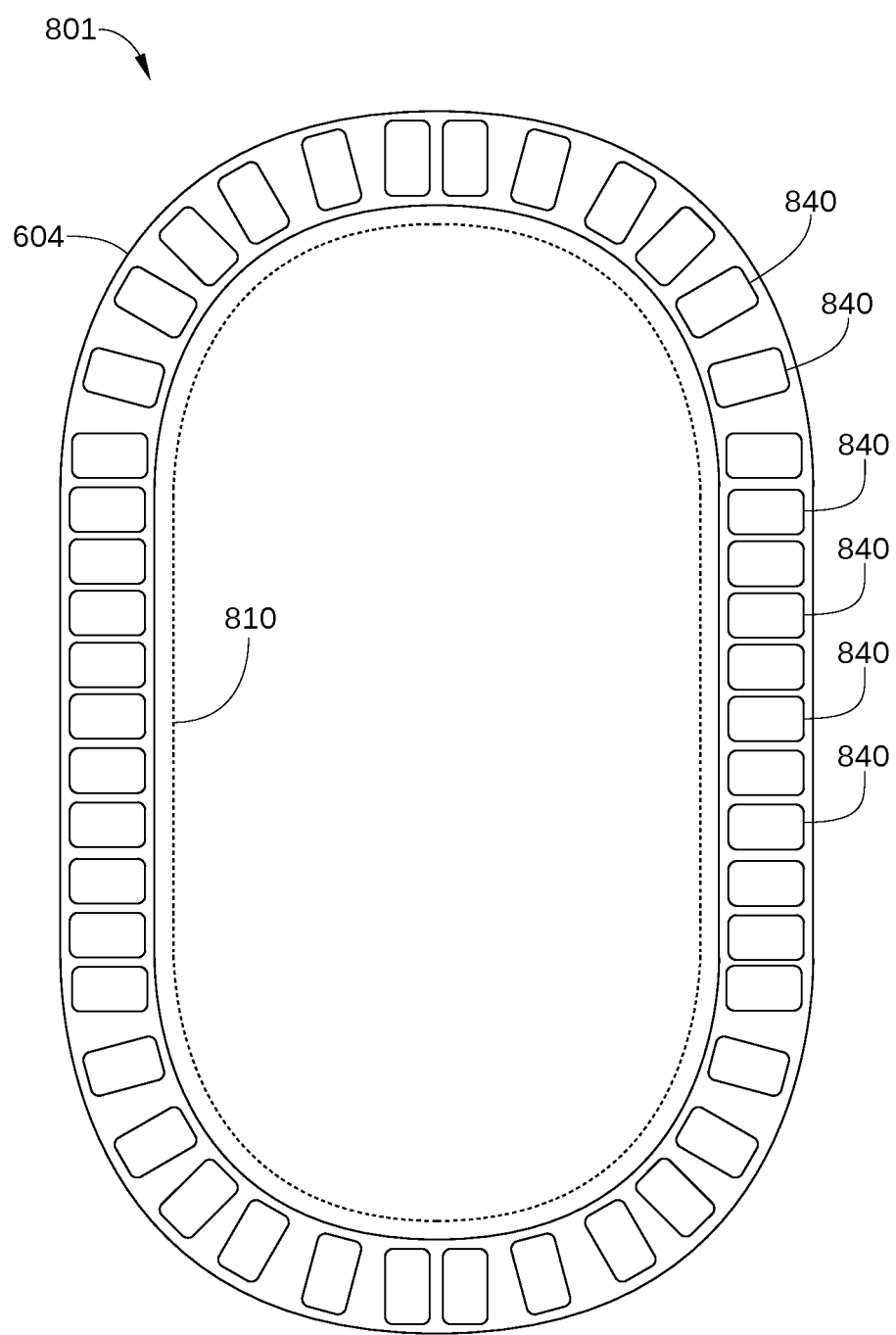
FIG. 8 schematically illustrates a plan view of an earcup of a head-worn audio device, configured according to the various embodiments.

FIG. 8 schematically illustrates a plan view of an earcup 801 of a head-worn audio device, configured according to the various embodiments. As shown, an acoustic cavity 810 is disposed within the confines of an ear-surround cushion 804, so that a user's outer ear (not shown) is contained within acoustic cavity 810. It is noted that in embodiments in which earcup 801 is included in a headphone system configured as a supra-aural headphone system, a user's outer ear is disposed adjacent to, rather within, acoustic cavity 810. In either case, changes in position or shape of contact elements 840 disposed on a contact surface 802 of ear-surround cushion 804 can be employed by computing device 160 to convey information to a wearer. Specifically, the wearer is provided with information through physical pressure that is asymmetrically applied to the head of the wearer via actuators (not shown for clarity) and contact elements 840. For instance, in one embodiment, to notify the wearer to move to the left or to direct his or her attention to the left, contact elements 840 included in the ear-surround cushion of a left earcup 801 can be controlled to move and/or change shape to direct the attention of the wearer to the left. Alternatively, in some embodiments, directional and/or navigation information is conveyed to a user by moving and/or changing the shape of contact elements 840 in both the left and right earcup 801 of the headphone system. For example, to generate the perception of the wearer's head being pushed in a desired direction, contact elements 840 in, for example, the left earcup 801, can be controlled to increase in size and/or to move away from a support frame included in the left earcup 801, while contact elements 840 in, for example, the right earcup 801, can be controlled to decrease in size and/or to move toward a support frame included in the right earcup 801. As a result, the wearer can have the perception that the head is being urged toward the right, as shown in FIG. 9.

Figure 9:
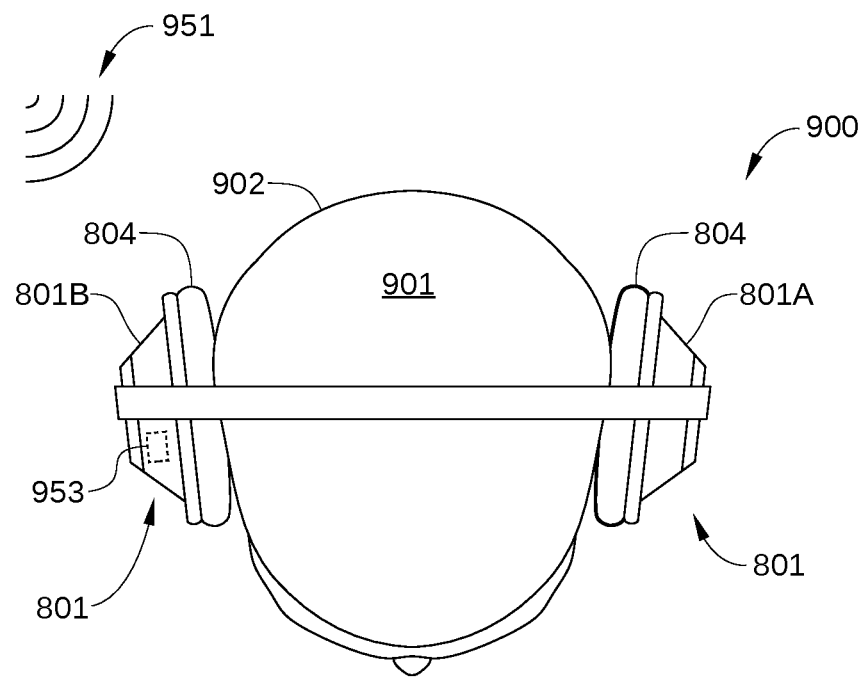
FIG. 9 schematically illustrates a headphone system that is configured to provide directional and/or navigational information to a wearer, according to various embodiments of the present disclosure.
Figure 9:
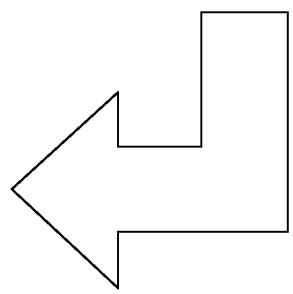

FIG. 9 schematically illustrates wearer 901 wearing headphone system 900 that is configured to provide directional and/or navigational information to wearer 901, according to various embodiments of the present disclosure. As shown, headphone system 900 includes earcups 801, and is therefore configured to direct attention of wearer 901 to the right or the left via asymmetrical application of pressure to head 902 of wearer 901. In the embodiment illustrated in FIG. 9, wearer 901 is notified to focus his or her attention to the right by an increase in pressure of ear-surround cushion 804 in earcup 801A against head 902, which can create the perception of head 902 being pushed to the right. In some embodiments, a corresponding decrease in pressure of ear-surround cushion 804 in earcup 801B against head 902 also occurs, to magnify the perceived "push" to the right. Alternatively or additionally, headphone system 900 is configured to interact with wearer 901 to direct the attention of wearer 901 in a particular direction by generating a different tactile input via one of earcups 801A or 801B. For example, to direct the attention of wearer 901 to the left, headphone system 900 may cause a tap, vibration, or the like to be generated by earcup 801A.

In some embodiments, the above described asymmetrical application of pressure against the head of a wearer is implemented in response to an environment sensor 953 in headphone system 900 receiving a signal 951 associated with a GNSS. In one such embodiment, environment sensor 953 receives location information from signal 951 and transmits the location information to computing device 160 via environmental input 102 (not shown). In response, computing device 160 determines that there is information to be conveyed to the wearer, based on the location information included in environmental input 102. For example, in one such embodiment, computing device 160 determines that there is navigation information to be conveyed to the wearer, such as an indication that a targeted destination is to the right of the wearer. Computing device 160 then conveys that the targeted destination is to the right of the wearer by causing actuators and contact elements (not shown) to generate asymmetrically applied pressure to head 902 as described above in conjunction with FIG. 8.

Alternatively or additionally, in some embodiments, asymmetrical application of pressure against head 902 is implemented in response to other inputs from environment sensors. In one such embodiment, an environment sensor included in headphone system 900 detects motion out of the line of sight of the wearer, and transmits a notification of such motion to computing device 160. For example, a motion detector may detect that a large object, such as a person or vehicle, is moving toward the wearer along a path that intersects with the current or predicted position of the wearer. In response, computing device 160 alerts the wearer to look in a certain direction via the above-described asymmetrical application of pressure against head 902. In another such embodiment, an environment sensor included in headphone system 900 receives a notification indicating that a particular wireless device in an Internet of Things (IoT) environment has a low battery. In response, computing device 160 alerts the wearer with, for example, an auditory notification, such as "The battery needs to be changed in one of your window security sensors." Alternatively, a tactile alert notification can be provided to the user via a vibration, pulsing, or other pressure-based input via actuators 130. When the wearer asks "Which one?" or "Where is it," computing device 160 encourages the wearer to look in a certain direction via the above-described asymmetrical application of pressure against head 902. When the wearer has oriented his or her head appropriately, each of earcups 801 returns to a default shape.

In some embodiments, the physical pressure employed to convey information to the wearer is applied on the ear, in the ear, around the ear, and/or anywhere on the head along the frame of the headphone system. Additionally or alternatively, in some embodiments, the physical pressure is applied in a time-varying fashion, for example, to indicate a particular direction. One such embodiment is illustrated in FIGS. 10A-10D.

FIGS. 10A-10D schematically illustrate a headband 1003 of a headphone system at various times during the process of conveying navigation information to a wearer, according to an embodiment of the present disclosure. Headband 1003 includes a plurality of contact elements 1040 that may be substantially similar to contact elements 140 in FIG. 1 and are configured to move and/or change shape. In FIG. 10A, headband 1003 is in a default state, and contacts a head 1002 of a wearer in a limited region 1001. In FIG. 10B, a controller (not shown) associated with the headphone system begins to convey navigation information over time to the wearer via headband 1003 by causing a first portion 1011 of contact elements 1040 to change shape and begin contacting head 1002 over a larger region 1021 on the left side of head 1002. Alternatively, if first portion 1011 of contact elements 1040 are already in contact with head 1002, the contact elements 1040 of first portion 1011 increase pressure on head 1002 in larger region 1021. In FIG. 10C, the controller continues to convey navigation information over time to the wearer via headband 1003 by causing a second portion 1012 of contact elements 1040 to change shape and begin contacting head 1002 over a larger region 1022 on the left side of head 1002. Alternatively, if second portion 1012 of contact elements 1040 are already in contact with head 1002, the contact elements 1040 of second portion 1012 increase pressure on head 1002 in a larger region 1022. In FIG. 10D, the controller continues to convey navigation information over time to the wearer via headband 1003 by causing a third portion 1013 of contact elements 1040 to change shape and begin contacting head 1002 over a still larger region 1023, or, if already in contact with head 1002, increasing pressure on head 1002. Because contact or pressure is applied to the wearer's head across the left side of head 1002 over time, the wearer is prompted to look or move to the left. In some embodiments, the above sequence is repeated until the wearer performs the prompted action.

Figure 11:
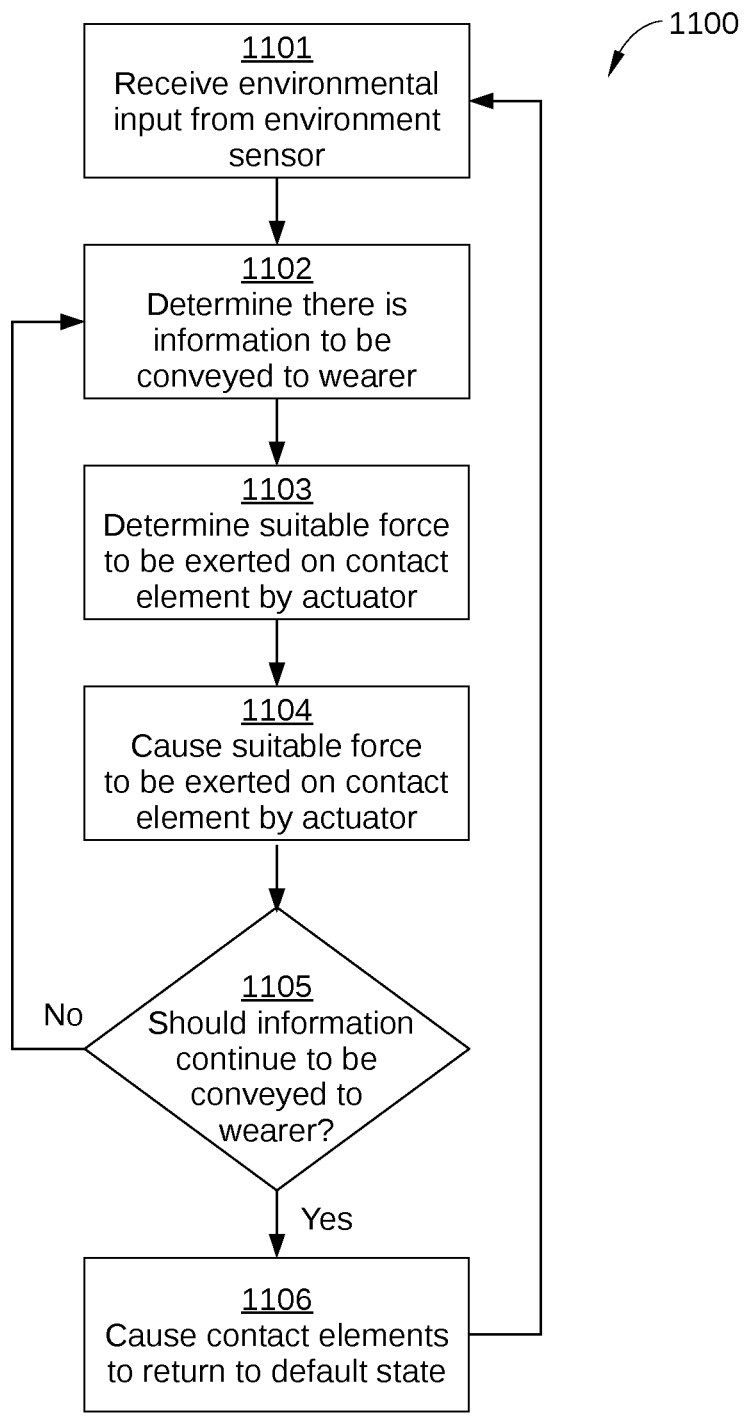
FIG. 11 sets forth a flowchart of method steps for tactile communication of information, according to various embodiments of the present disclosure.

FIG. 11 sets forth a flowchart of method steps for tactile communication, according to various embodiments of the present disclosure. Although the method steps are described with respect to the systems of FIGS. 1-10D, persons skilled in the art will understand that any system configured to perform the method steps, in any order, falls within the scope of the various embodiments.

As shown, a method 1100 begins at step 1101, in which computing device 160 receives environmental input 102 from one or more environment sensors 152. Environment sensor 152 can generate environmental input 102 in response to receiving information from a device external to head-worn audio system 100, such as information data from a GPS transmitter or a notification from a wireless device. In such embodiments, environment sensor 152 includes location information, such as proximity and orientation to a target destination, in environment input 102. Alternatively or additionally, in some embodiments, environment sensor 152 is a location-indicating sensor included in head-worn audio system 100, such as a rangefinder, imaging sensor, radar-based sensor, and the like. In some embodiments, environment sensor 152 includes location information of one or more objects relative to head-worn audio system 100 in environment input 102. Alternatively or additionally, in some embodiments, environment sensor 152 determines heading angle, such as which direction the wearer is facing. In such embodiments, the environment sensor 152 can include a magnetometer in combination with an inertial measurement unit (IMU), such as a set of accelerometers and/or gyroscopic sensors.

In step 1102, computing device 160 determines that there is information to be conveyed to the wearer, based on environment input 102. For example, environment input 102 may include a notification for the wearer from a device external to head-worn audio system 100 or location information indicating that the wearer should change direction to reach a target destination.

In step 1103, computing device 160 determines a suitable force to be exerted against one or more contact element 140 by actuators 130. In some embodiments, the suitable force to be exerted on each of the one or more contact elements 140 by actuators 130 is based on the information to be conveyed to the user. When such information includes navigation information, the suitable forces can include forces that cause a perceived push of the wearer's head in a certain direction. When such information includes a notification for the wearer, the suitable forces can include forces that cause a particular series of pulses or other changes in pressure on the head of the wearer.

In step 1104, computing device 160 causes the suitable forces determined in step 1103 to be exerted against the appropriate contact elements 140 via actuator 130. In step 1105, computing device 160 determines whether the information should continue to be conveyed to the wearer. If yes, method 1100 proceeds back to step 1103; if no, method 1100 proceeds to step 1106.

In step 1106, computing device 160 causes the contact elements 140 to return to a default state, such as an unmodified shape. In some embodiments, method 1100 terminates, and in other embodiments, method 11 proceeds back to step 1101.

Figure 12:
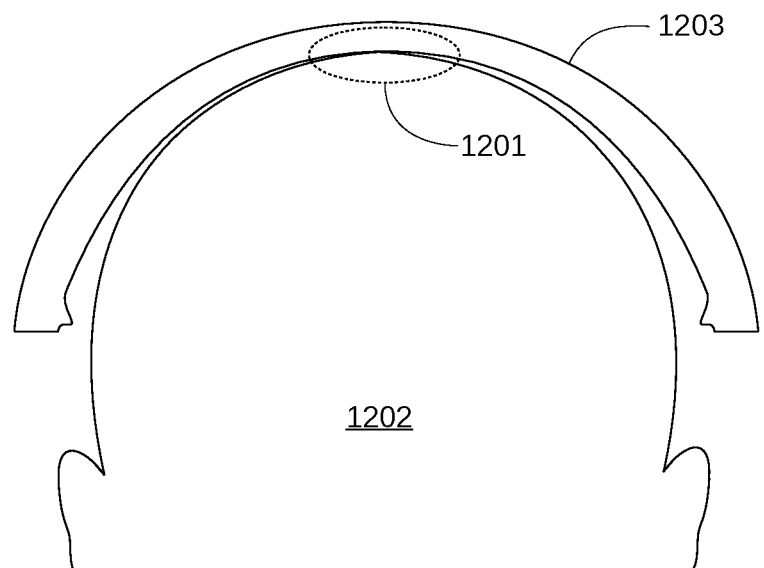
FIG. 12 schematically illustrates a headband of a conventional headphone system positioned on a head of a wearer.
Figure 13:
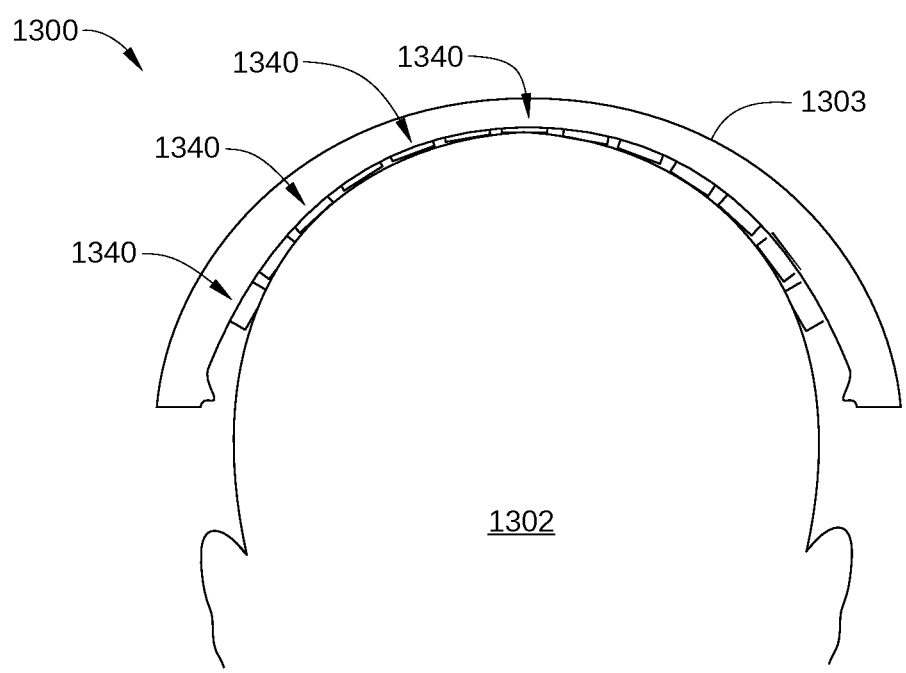
FIG. 13 schematically illustrates a headband of a headphone system positioned on a head of a wearer, according to various embodiments of the present disclosure.

In some embodiments, the fit of a headphone system is improved by changing the shape of contact elements in a headband of the headphone system. One such embodiment is illustrated in FIGS. 12 and 13. FIG. 12 schematically illustrates a headband 1203 of a conventional headphone system positioned on a head 1202 of a wearer. As shown, headband 1203 does not conform well to the shape of head 1202, only contacting head 1203 in a limited area 1201. Thus, a headphone system that includes headband 1203 can be unstable and uncomfortable, and potentially contributes to impaired acoustic performance because one or both earcups could be positioned suboptimally causing acoustic leakage. FIG. 13 schematically illustrates a headband 1303 of a headphone system 1300 positioned on a head 1302 of a wearer, according to various embodiments of the present disclosure. As shown, headband 1303 contacts head 1302 across the length of headband 1303, since contact elements 1340 have moved or changed shape to conform to head 1302. As a result, regardless of the shape of head 1302, headphone system 1300 has a better fit than a conventional headphone system. As a result, a headphone system that includes headband 1303 better fits head 1302, is more comfortable and less likely to slip or fall off than a headphone system that includes headband 1203, and typically has improved acoustical performance.

Figure 14:
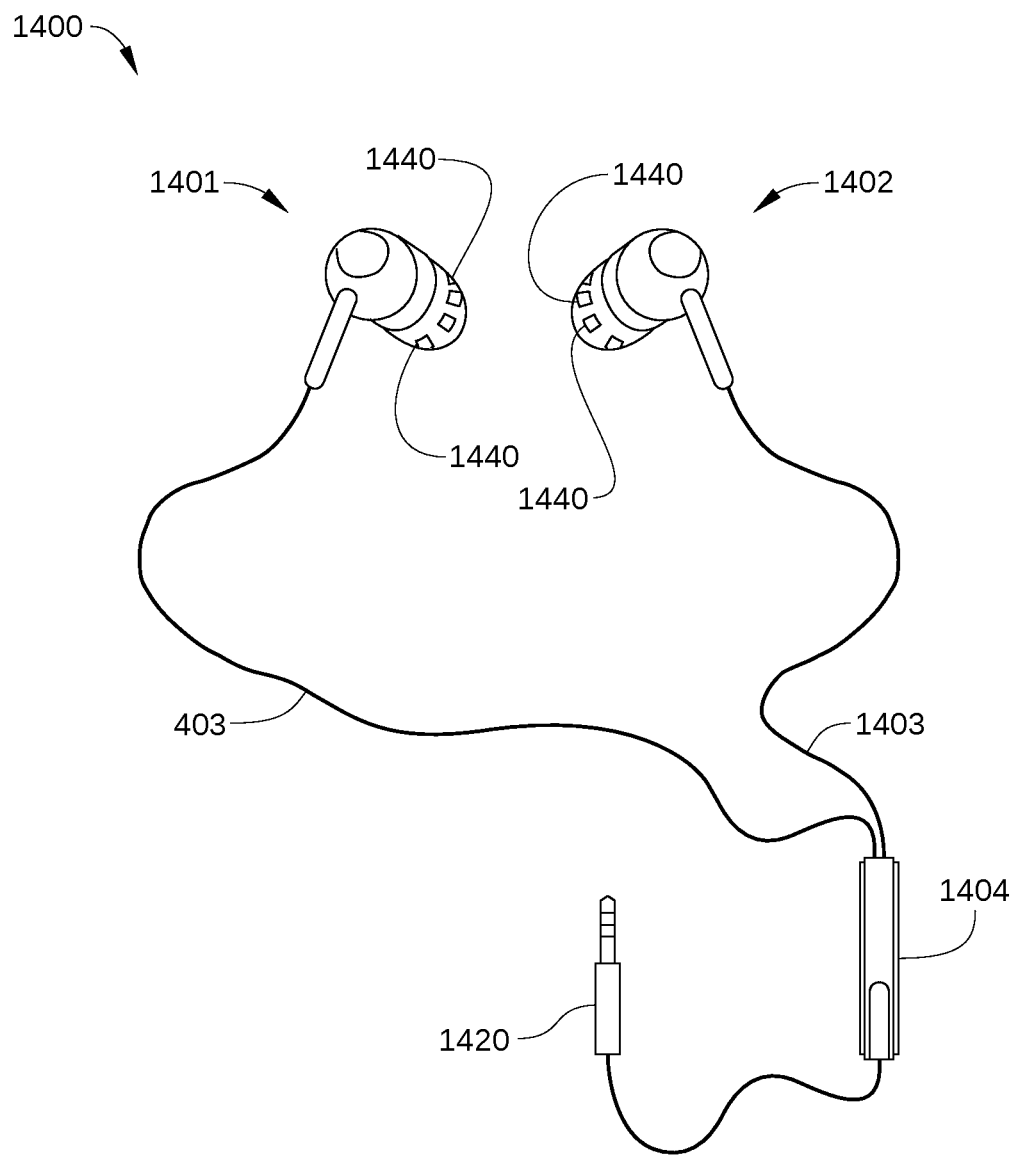
FIG. 14 is a schematic diagram illustrating an ear-mounted device configured to implement various aspects of the present disclosure.

In some embodiments, head-worn audio system 100 is implemented in an ear-mounted device, such as an earbud system or earpiece or hearable. One such embodiment is illustrated in FIG. 14. FIG. 14 is a schematic diagram illustrating an ear-mounted device 1400 configured to implement various aspects of the present disclosure. Ear-mounted device 1400 includes, without limitation, a left earbud 1401 and a right earbud 1402, each coupled to a plug assembly 1420 via a wired connection 1403. Alternatively, left earbud 1401 and right earbud 1402 may be configured as wireless earbuds. Ear-mounted device 1400 may further include, without limitation, a volume control module 1404 coupled to left earbud 1401, right earbud 1402, and plug assembly 1420 as shown. Stereo earbud system 1400 further includes, without limitation, contact elements 1440 disposed on a surface of left earbud 1401 and right earbud 1402. Thus, when a wearer has inserted left earbud 1401 and right earbud 1402, contact elements 1440 are positioned in contact with respective locations within an ear canal of the wearer. When contact elements 1440 are caused to change shape or otherwise move against a surface within the ear canal of the wearer, a robust acoustic seal is formed and/or information is communicated to the wearer.

Figure 15:
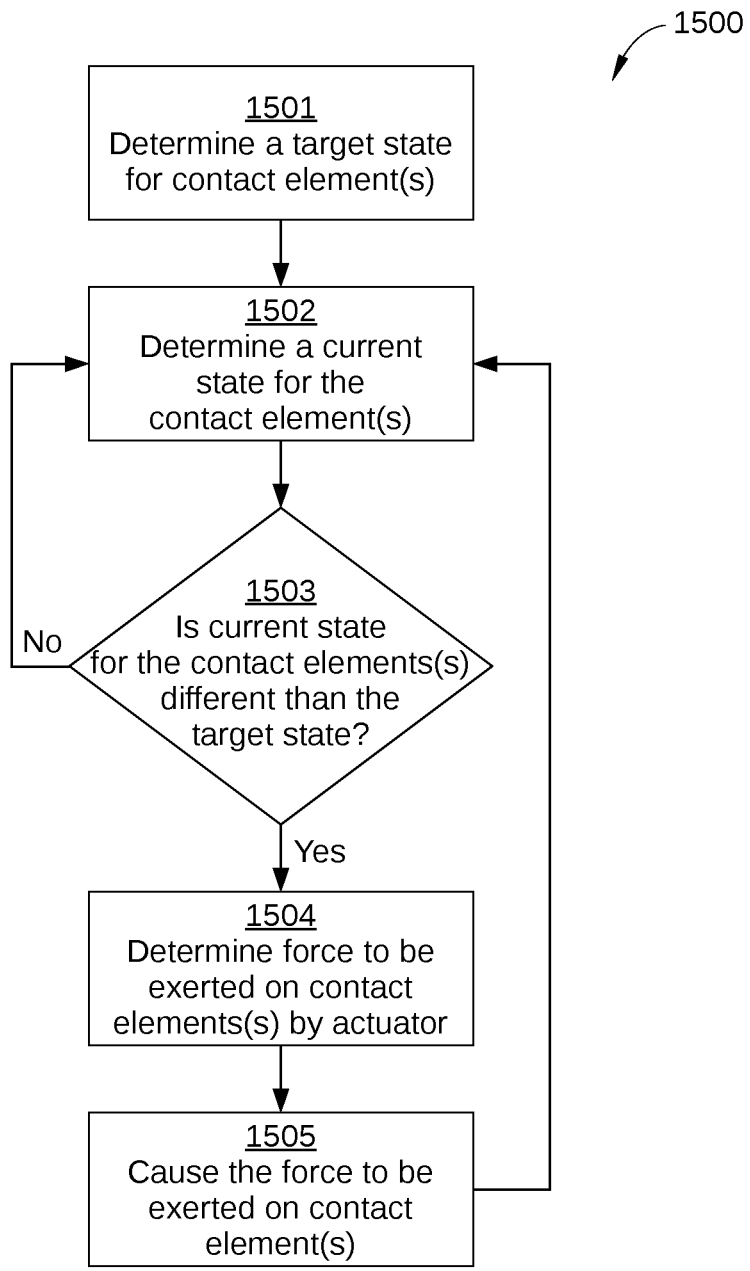
FIG. 15 sets forth a flowchart of method steps for tactile communication, according to various embodiments of the present disclosure.

FIG. 15 sets forth a flowchart of method steps for tactile communication, according to various embodiments of the present disclosure. Although the method steps are described with respect to the systems of FIGS. 1-14, persons skilled in the art will understand that any system configured to perform the method steps, in any order, falls within the scope of the various embodiments.

As shown, a method 1500 begins at step 1501, in which computing device 160 determines a target state for one or more contact elements 140. The target state for a particular contact element 140 can include, without limitation, a target position of the contact element 140 or corresponding actuator 130, a target shape, a target threshold contact pressure between the contact element 140 and a corresponding surface of the head of the wearer, etc. In some embodiments, the target state for each of the contact elements is based on a current mode of head-worn audio system 100. For example, in one such embodiment, head-worn audio system 100 operates in a unique mode for each different wearer. In another embodiment, the current mode is selected by the wearer. In such an embodiment, the wearer may select between a mode in which an acoustic seal is to be formed by computing device 160 when head-worn audio system 100 is worn and a mode in which an acoustic seal is broken to allow ambient sound, such as a voice, to be heard by the wearer. In yet another embodiment, the current mode is based on feedback signal 103 from one or more feedback sensors 153.

In step 1502, computing device 160 determines a current state for each of the one or more contact elements 140. In some embodiments, the current state of each contact element 140 can be based on a feedback signal 103 from a feedback sensor 153 associated with that specific contact element 140.

In step 1503, computing device 160 determines whether the current state for any contact elements 140 is a different state than the target state. If no, method 1500 proceeds back to step 1502; if yes, method proceeds to step 1504.

In step 1504, for each contact element that is in a different state than the target state, computing device 160 determines a force to be exerted against contact element 140 by an actuator 130 associated with that contact element. In some embodiments, computing device 160 determines the force to be exerted based on a feedback signal 103 from a feedback sensor 153 associated with that specific contact element 140.

In step 1505, for each contact element that is in a different state than the target state, computing device 160 causes the force determined in step 1504 to be exerted against that contact element 140 by an actuator 130 associated with that contact element. Method 1500 then proceeds back to step 1502.

In sum, various embodiments set forth systems and techniques for providing high-fidelity sound reproduction in a head-worn audio device. Various embodiments further set forth systems and techniques for receiving information while using a head-worn audio device. One or more actuator(s) are controlled in response to feedback signal(s) to effect motion and/or changes in the shape(s) of one or more contact elements in the head-worn audio device. As a result, the contact elements can each be positioned in contact with a surface of the head of a wearer, which enables an acoustic seal to be generated. Additionally or alternatively, the contact elements can be moved in order to communicate information to the wearer.

At least one advantage of the disclosed embodiments is that a head-worn audio device can be adapted to the ear, scalp, or other surfaces of the head of a particular user in order to minimize or otherwise reduce leakage of ambient sound. A further advantage is that information, such as navigation instructions, can be provided to the wearer of a head-worn audio device in a tactile way, without interrupting an audio and/or visual presentation to the user.

1. In some embodiments, a head-worn audio system, comprises a support frame; a first contact element configured to contact a first portion of a head of a user; a first actuator coupled to the support frame and configured to move the first contact element; a first sensor configured to generate a first sensor signal indicating a first state of the first contact element and a second sensor signal indicating a second state of the first contact element; and a processor that is communicatively coupled to the first actuator and the first sensor and is configured to cause the first actuator to move the first contact element from a first position that corresponds to the first state to a second position that corresponds to the second state, wherein, in the second state, the first contact element is in contact with the head of the user.

2. The system of clause 1, wherein the head-worn audio system further includes: a second contact element configured to contact a second portion of the head of the user; a second actuator coupled to the support frame and configured to move the second contact; and a second sensor configured to generate a third sensor signal indicating a third state of the second contact element and a fourth sensor signal indicating a fourth state of the second contact element, wherein the processor is further configured to cause the second actuator to move the second contact element from a third position that corresponds to the third state to a fourth position that corresponds to the fourth state, wherein, in the fourth state, the second contact element is in contact with the head of the user.

3. The system of clauses 1 or 2, wherein the first state of the first contact element comprises at least one of a current actuation position of the first actuator, a current pneumatic pressure applied to the first actuator, a current hydraulic pressure applied to the first actuator, a current contact pressure between the first contact element and the first portion of the head of the user, a current temperature of a shape-memory alloy included in the first contact element, a current electric field strength applied to a material that is actuated via the electric field and included in the first contact element, a current magnetic field strength applied to a material that is actuated via the magnetic field and included in the first contact element, a current intensity of light applied to a photomechanical material included in the first contact element, a current intensity of light entering a cavity between an ear of the user and the first audio device, a current sound energy level of ambient sound leaking into the cavity, and a current sound energy level of ambient sound leaking out of the cavity.

4. The system of any of clauses 1-3, wherein the second state comprises a threshold contact pressure being present between the first contact element and the first portion of the head of the user, and the processor is further configured to move the first contact element from the first position until the first sensor generates the second sensor signal indicating that the first contact element is in the second state.

5. The system of any of clauses 1-4, wherein the head-worn audio system comprises an ear-mounted device.

6. The system of any of clauses 1-5, wherein the support frame comprises a rigid structure of the ear-mounted device.

7. The system of any of clauses 1-6, wherein the first contact element comprises a portion of an outer surface of the ear-mounted device.

8. The system of any of clauses 1-7, wherein the system comprises a headphone-based assembly.

9. The system of any of clauses 1-8, wherein the support frame comprises at least one of an earcup of the headphone-based assembly and a headband of the headphone-based assembly.

10. The system of any of clauses 1-9, wherein the first contact element comprises a portion of a surface of a cushion coupled to the earcup.

11. The system of any of clauses 1-10, wherein the first sensor includes at least one of an optical sensor exposed to a cavity between an ear of the user and the head-worn audio system, an optical sensor configured to measure a light source included in the head-worn audio system, an acoustic sensor included in the head-worn audio system, a thermal sensor in thermal contact with the first contact element, a strain gauge disposed on the first contact element, a fluid pressure sensor associated with the first actuator, a fluid flow sensor associated with the first actuator, and a piezoelectric sensor disposed on the first contact element.

12. The system of any of clauses 1-11, wherein the first actuator moves the first contact element from the first position to the second position by causing the first contact element to change from a first shape to a second shape.

13. The system of any of clauses 1-12, wherein the first actuator causes the first contact element to change from the first shape to the second shape via at least one of a mechanical actuator, application of a pneumatic pressure to the first contact element, application of a hydraulic pressure to the first contact element, application of an electric field to the first contact element, application of an electric field to the first contact element, application of heat to the first contact element, and application of light to the first contact element.

14. In some embodiments, a non-transitory computer-readable storage medium including instructions that, when executed by one or more processors, configure the one or more processors to perform the steps of: receiving a first sensor signal indicating a first state of a contact element that is included in a head-worn audio device that corresponds to the contact element being in a first position, wherein the contact element is configured to contact a portion of a head of a user; in response, causing an actuator to move the contact element from the first position to a second position that corresponds to a second state of the contact element, wherein, in the second state, the contact element is in contact with the head of the user.

15. The non-transitory computer-readable storage medium of clause 14, wherein the head-worn audio device further comprises an environment sensor configured to receive location information from a device external to the system.

16. The non-transitory computer-readable storage medium of any of clauses 14-15, wherein the head-worn audio device further comprises an environment sensor configured to generate at least one of location information and heading information for the system.

17. The non-transitory computer-readable storage medium of any of clauses 14-16, wherein causing the actuator to move the contact element from the first position to a second position comprises causing the actuator to move the contact element from the first position until receiving a second sensor signal indicating the contact element is in the second position.

18. In some embodiments, a method for forming an acoustic seal in a head-worn audio device, the method comprises: receiving a first sensor signal indicating a first state of a first contact element that is included in a head-worn audio device that corresponds to the first contact element being in a first position, wherein the first contact element is configured to contact a first portion of a head of a user; in response, causing a first actuator to move the first contact element from the first position to a second position that corresponds to a second state of the first contact element, wherein, in the second state, the first contact element is in contact with the head of the user.

19. The method of any of clause 18, wherein causing the first actuator to move the first contact element from the first position to the second position so that the first contact element contacts the first portion of the head comprises causing the first actuator to move the first contact element from the first position until a threshold contact pressure is detected between the first portion of the head and the first contact element.

20. The method of any of clauses 18-19, further comprising: receiving a second sensor signal indicating a third state of a second contact element that is included in a head-worn audio device that corresponds to the second contact element being in a third position, wherein the second contact element is configured to contact a second portion of the head of the user; in response, causing a second actuator to move the second contact element from the third position to a fourth position that corresponds to a fourth state of the second contact element, wherein, in the second state, the second contact element is in contact with the head of the user.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:
1. A head-worn audio system, comprising:
 a support frame;
 a set of contact elements configured to contact a first portion of a head of a user, the set of contact elements including a first contact element and a second contact element disposed on a contact surface;
 a set of actuators coupled to the support frame and configured to move the first contact element and the second contact element;
 a first sensor configured to generate:
  a first sensor signal indicating a first state that corresponds to the first contact element being in a first position and the second contact element being in a second position, and
  a second sensor signal indicating a second state that corresponds to at least one of the first contact ele- ment or the second contact element being in contact with the head of the user; and a second sensor configured to generate a third sensor signal indicating location information associated with an environment around the user;

a processor that is communicatively coupled to the set of actuators, the first sensor, and the second sensor and is configured to, in response to receiving the first sensor signal indicating the first state and the third sensor signal indicating the location information, cause the set of actuators to change a shape of the contact surface by moving the first contact element relative to the second contact element to a position corresponding to the second state.

2. The system of claim 1, wherein the first state of the first contact element comprises at least one of:
a current actuation position of at least one of the set of actuators,
a current pneumatic pressure applied to at least one of the set of actuators,
a current hydraulic pressure applied to at least one of the set of actuators,
a current contact pressure between the first contact element and the first portion of the head of the user,
a current temperature of a shape-memory alloy included in the first contact element,
a current electric field strength applied to a material that is actuated via an electric field and included in the first contact element,
a current magnetic field strength applied to a material that is actuated via a magnetic field and included in the first contact element,
a current intensity of light applied to a photomechanical material included in the first contact element,
a current intensity of light entering a cavity between an ear of the user and the head-worn audio system,
a current sound energy level of ambient sound leaking into the cavity, or a current sound energy level of ambient sound leaking out of the cavity.

3. The system of claim 1, wherein the second state comprises a threshold contact pressure being present between the first contact element and the first portion of the head of the user, and the processor is further configured to move the first contact element from the first position until the first sensor generates the second sensor signal indicating that the first contact element is in the second state.

4. The system of claim 1, further comprising an ear-mounted device.

5. The system of claim 4, wherein the support frame comprises a rigid structure of the ear-mounted device.

6. The system of claim 4, wherein the first contact element comprises a portion of an outer surface of the ear-mounted device.

7. The system of claim 1, wherein the system comprises a headphone-based assembly.

8. The system of claim 7, wherein the support frame comprises at least one of an earcup of the headphone-based assembly or a headband of the headphone-based assembly.

9. The system of claim 8, wherein the first contact element comprises a portion of a surface of a cushion coupled to the earcup.

10. The system of claim 1, wherein the first sensor includes at least one of:
an optical sensor exposed to a cavity between an ear of the user and the head-worn audio system,
an optical sensor configured to measure a light source included in the head-worn audio system,
an acoustic sensor included in the head-worn audio system,
a thermal sensor in thermal contact with the first contact element,
a strain gauge disposed on the first contact element,
a fluid pressure sensor associated with at least one of the set of actuators,
a fluid flow sensor associated with at least one of the set of actuators, or
a piezoelectric sensor disposed on the first contact element.

11. The system of claim 1, wherein a first actuator included in the set of actuators moves the first contact element from the first position to the second position by causing the first contact element to change from a first shape to a second shape.

12. The system of claim 11, wherein the first actuator causes the first contact element to change from the first shape to the second shape via at least one of:
a mechanical actuator,
application of a pneumatic pressure to the first contact element,
application of a hydraulic pressure to the first contact element,
application of an electric field to the first contact element,
application of heat to the first contact element, or
application of light to the first contact element.

13. One or more non-transitory computer-readable storage media including instructions that, when executed by one or more processors, cause the one or more processors to perform the steps of:
receiving a first sensor signal indicating a first state that corresponds to a set of contact elements that are included in a head-worn audio device and disposed on a contact surface, wherein the first state corresponds to a first contact element included in the set of contact elements being in a first position and a second contact element included in the set of contact elements being in a second position;
receiving a second sensor signal indicating location information associated with an environment around a user; and
in response to receiving the first sensor signal indicating the first state and the second sensor signal indicating the location information, causing a set of actuators that are coupled to a support frame to change a shape of the contact surface by moving the first contact element relative to the second contact element to a position corresponding to a second state that corresponds to at least one of the first contact element or the second contact element being in contact with a head of the user.

14. The one or more non-transitory computer-readable storage media of claim 13, wherein the head-worn audio device comprises an environment sensor configured to receive the location information from a device external to the head-worn audio device.

15. The one or more non-transitory computer-readable storage media of claim 14, wherein causing the set of actuators to move the first contact element comprises causing the set of actuators to move the first contact element from the first position until receiving a third sensor signal indicating the second state.

16. The one or more non-transitory computer-readable storage media of claim 13, wherein the head-worn audio device comprises an environment sensor configured to generate at least one of the location information or heading information for the head-worn audio device.

17. A method for forming an acoustic seal in a head-worn audio device, the method comprising:

receiving a first sensor signal indicating a first state that corresponds to a set of contact elements that are included in the head-worn audio device and disposed on a contact surface, wherein the first state corresponds to a first contact element included in the set of contact elements being in a first position and a second contact element included in the set of contact elements being in a second position;

receiving a second sensor signal indicating location information associated with an environment around a user; and in response to receiving the first sensor signal indicating the first state and the second sensor signal indicating the location information, causing a set of actuators that are coupled to a support frame to change a shape of the contact surface by moving the first contact element relative to the second contact element to a position corresponding to a second state that corresponds to at least one of the first contact element or the second contact element being in contact with a head of the user.

18. The method of claim 17, wherein causing the set of actuators to move the first contact element from the first position comprises causing the set of actuators to move the first contact element from the first position until a threshold contact pressure is detected between a first portion of the head and the first contact element.

* * * * *